(12) United States Patent
Kapusky et al.

(10) Patent No.: US 12,275,338 B2
(45) Date of Patent: Apr. 15, 2025

(54) SEAT ASSEMBLY WITH RETURN INTERLOCK ELEMENT

(71) Applicant: Magna Seating Inc., Aurora (CA)

(72) Inventors: Michael Kapusky, South Lyon, MI (US); Ronald A Zimmerman, II, White Lake, MI (US)

(73) Assignee: Magna Seating Inc., Aurora (CA)

( * ) Notice: Subject to any disclaimer, the term of this patent is extended or adjusted under 35 U.S.C. 154(b) by 436 days.

(21) Appl. No.: 17/784,747

(22) PCT Filed: Dec. 14, 2020

(86) PCT No.: PCT/US2020/064778
§ 371 (c)(1),
(2) Date: Jun. 13, 2022

(87) PCT Pub. No.: WO2021/119576
PCT Pub. Date: Jun. 17, 2021

(65) Prior Publication Data
US 2023/0018025 A1    Jan. 19, 2023

Related U.S. Application Data

(60) Provisional application No. 62/947,734, filed on Dec. 13, 2019.

(51) Int. Cl.
*B60N 2/30* (2006.01)
*B60N 2/12* (2006.01)
(Continued)

(52) U.S. Cl.
CPC ............ *B60N 2/3011* (2013.01); *B60N 2/123* (2013.01); *B60N 2/14* (2013.01); *B60N 2/1615* (2013.01); *B60N 2/3065* (2013.01)

(58) Field of Classification Search
CPC ........ B60N 2/123; B60N 2/14; B60N 2/1615; B60N 2/3011; B60N 2/3031; B60N 2/3065
(Continued)

(56) References Cited

U.S. PATENT DOCUMENTS 10,442,320 B2 * 10/2019 Kish ........................ B60N 2/10
10,442,322 B2 * 10/2019 Handigol ............. B60N 2/1695
(Continued)

FOREIGN PATENT DOCUMENTS

| DE | 102016225843 | 2/2018 |
|---|---|---|
| EP | 1790522 | 5/2007 |
| EP | 3243695 | 11/2017 |

*Primary Examiner* — Jason S Daniels
(74) *Attorney, Agent, or Firm* — Miller Canfield

(57) ABSTRACT

A seat assembly for movement between a plurality of positions within an automotive vehicle includes a seat back pivotally coupled to a seat cushion and a seat track assembly with a sliding track repositionable along a fixed track for movement of the seat assembly between a forward position and a rearward position. A linkage assembly extends between the seat cushion and the sliding track for movement of the seat cushion between an easy entry position and a design position. An interlock element is pivotally coupled to the sliding track. Movement of the seat assembly from the forward position to the rearward position pivots the interlock element from a locked condition engaged with the linkage assembly for holding the seat cushion in the easy entry position, to an unlocked condition disengaged from the linkage assembly for allowing movement of the seat cushion to the design position.

26 Claims, 14 Drawing Sheets

(51) Int. Cl.
 *B60N 2/14* (2006.01)
 *B60N 2/16* (2006.01)
(58) Field of Classification Search
 USPC .......................................... 296/65.01, 65.13
 See application file for complete search history.

(56) References Cited

U.S. PATENT DOCUMENTS

| | | |
|---|---|---|
| 10,479,232 B2 | 11/2019 | Cooley |
| 11,322,044 B2 * | 5/2022 | Matsunaga .......... A61B 5/1126 |
| 11,975,634 B2 * | 5/2024 | Zimmerman, II ....... B60N 2/20 |
| 2007/0278814 A1 * | 12/2007 | Kojima .................. B60N 2/123 |
| | | 296/65.15 |
| 2019/0366879 A1 | 12/2019 | Escobedo et al. |
| 2020/0223327 A1 | 7/2020 | Aktas et al. |

* cited by examiner

SEAT ASSEMBLY WITH RETURN INTERLOCK ELEMENT

CROSS-REFERENCE TO RELATED APPLICATIONS

This application claims priority to and all the benefits of U.S. Provisional Application 62/947,734, filed on Dec. 13, 2019, which is hereby incorporated by reference in its entirety.

BACKGROUND OF THE INVENTION

1. Field of the Invention

The present invention relates to a seat assembly adapted to be mounted to a floor of an automotive vehicle for movement between a plurality of positions.

2. Description of Related Art

Seat assemblies adapted to be mounted to a floor of an automotive vehicle for movement between a plurality of positions are known in the art. Typical seat assemblies include a seat cushion for supporting an occupant in the automotive vehicle and a seat back pivotally coupled to the seat cushion. The seat assemblies also include a seat track assembly for sliding movement of the seat assembly between a forward position and a rearward position along the floor of the automotive vehicle. The seat track assembly includes a sliding track repositionable along a fixed track. At least one link extends longitudinally between the seat cushion and the sliding track. The at least one link is rotatable for moving the seat cushion between an easy entry position in which the seat cushion tilts forwardly and downwardly toward the floor of the automotive vehicle and a design position in which the seat cushion is spaced from the floor of the automotive vehicle to support an occupant. However, seat cushions of typical seat assemblies known in the art can erroneously and prematurely shift from the easy entry position to the design position prior to the seat assembly reaching an intermediate position along the floor of the automotive vehicle, including when the seat assembly is located at or just adjacent to the forward position.

SUMMARY OF THE INVENTION

According to one aspect of the invention, a seat assembly adapted to be mounted to a floor of an automotive vehicle is provided for movement between a plurality of positions. The seat assembly includes a seat cushion for supporting an occupant in the automotive vehicle and a seat back pivotally coupled to the seat cushion. The seat assembly further includes a seat track assembly for sliding movement of the seat assembly between a forward position and a rearward position along the floor of the automotive vehicle. The seat track assembly includes a sliding track repositionable along a fixed track. At least one link extends longitudinally between the seat cushion and the sliding track. The at least one link is rotatable for moving the seat cushion between an easy entry position in which the seat cushion tilts forwardly and downwardly toward the floor of the automotive vehicle and a design position in which the seat cushion is spaced from the floor of the automotive vehicle to support an occupant. An interlock element is pivotally coupled to the sliding track and extends longitudinally between a first end having an interlock hook and a second end having an interlock leg. Movement of the seat assembly from the forward position to the rearward position pivots the interlock element from a locked condition in which the interlock hook is engaged with one of the seat cushion or the at least one link for holding the seat cushion in the easy entry position to an unlocked condition in which the interlock hook is disengaged from the one of the seat cushion or the at least one link for allowing movement of the seat cushion to the design position.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 2:
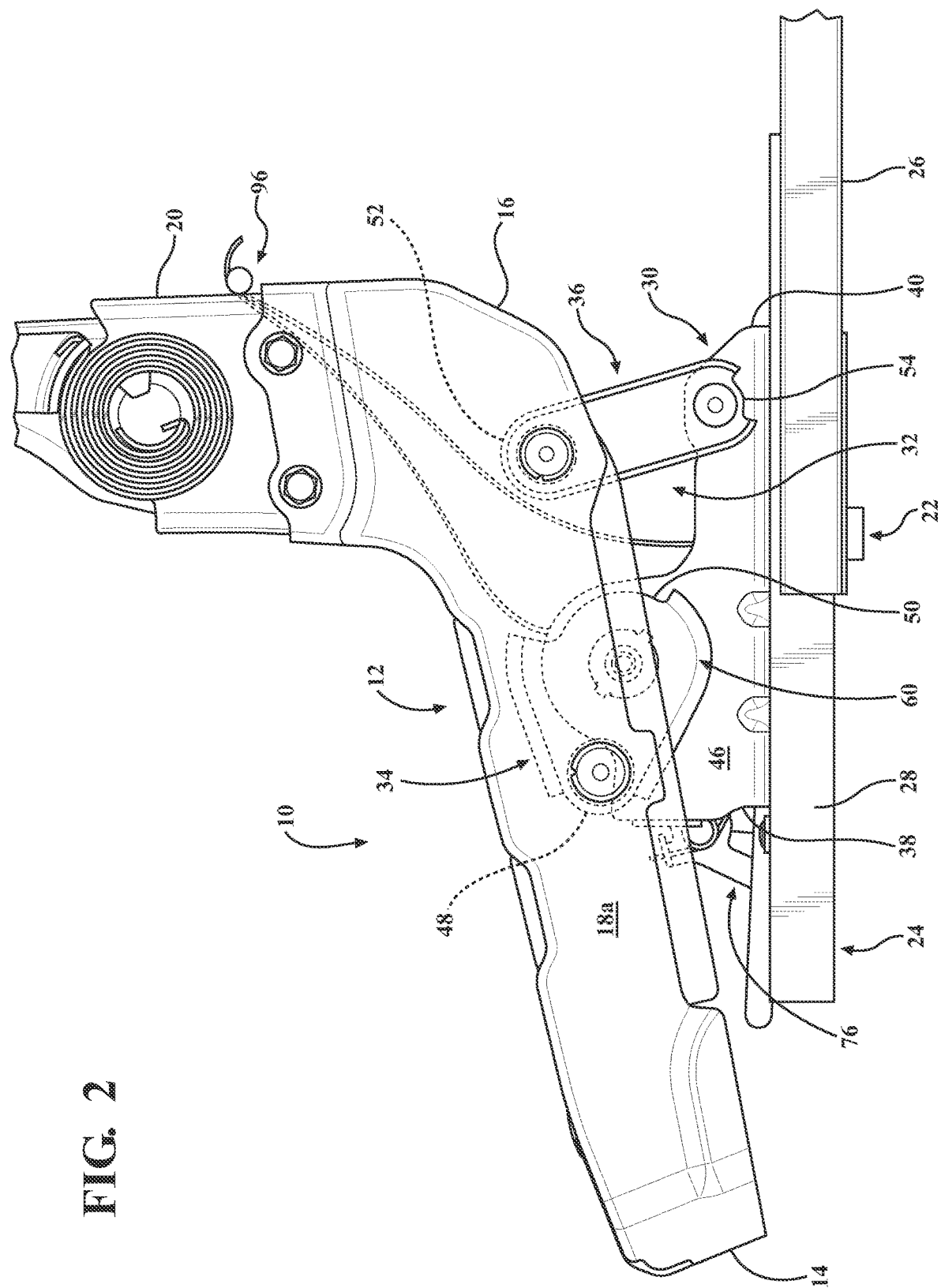
FIG. 2 is a fragmentary side view of the seat assembly of FIG. 1 showing the seat cushion in an easy entry position.

Referring to the Figures, wherein like numerals indicate like or corresponding parts throughout the several views, a seat assembly adapted to be mounted to a floor of an automotive vehicle for movement between a plurality of positions is shown generally at 10. The seat assembly 10 includes seat cushion 12 extending between a front portion 14 and a rear portion 16 with opposing lateral sides 18a, 18b. A seat back 20 is coupled adjacent to the rear portion 16 of the seat cushion 12 for pivotal movement of the seat back 20 between a plurality of reclined and folded positions. The seat assembly 10 further includes a seat track assembly, shown generally at 22, for fore and aft sliding movement of the seat assembly 10 within the automotive vehicle. The seat track assembly 22 has a pair of sliding tracks 24 repositionable along a pair of laterally spaced apart fixed tracks 26 mounted to the floor of the automotive vehicle. Although only one fixed track 26 and one sliding track 24 are shown in the Figures, it is to be appreciated that each pair of sliding and fixed tracks 24, 26 are substantially the same. Referring to FIG. 2, each sliding track 24 includes a sliding member 28 slidably engaged with the fixed track 26 and a base member 30 coupled to a linkage assembly, shown generally at 32. The linkage assembly 32 extends between and operatively connects the seat cushion 12 to the sliding track 24 of the seat track assembly 22.

Figure 1:
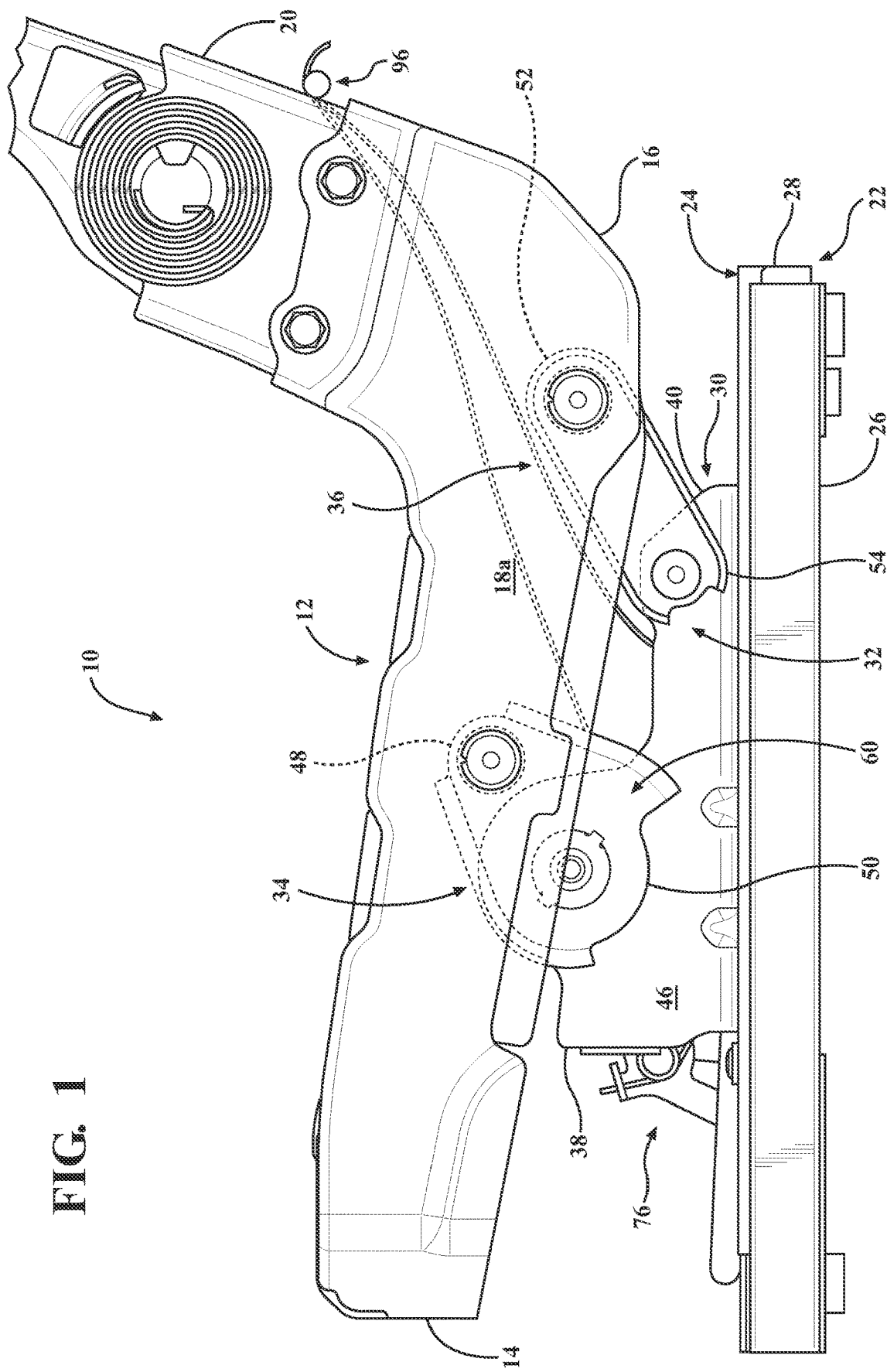
FIG. 1 is a fragmentary side view of a seat assembly for use in an automotive vehicle showing a seat cushion in a design position.
Figure 3A:
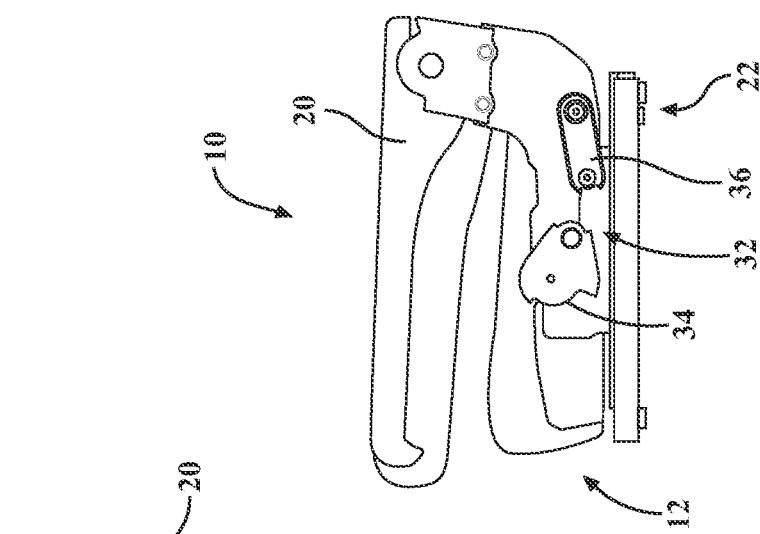
FIG. 3A is a side view of the seat assembly of FIG. 1 showing the seat cushion in the easy entry position.
Figure 3B:
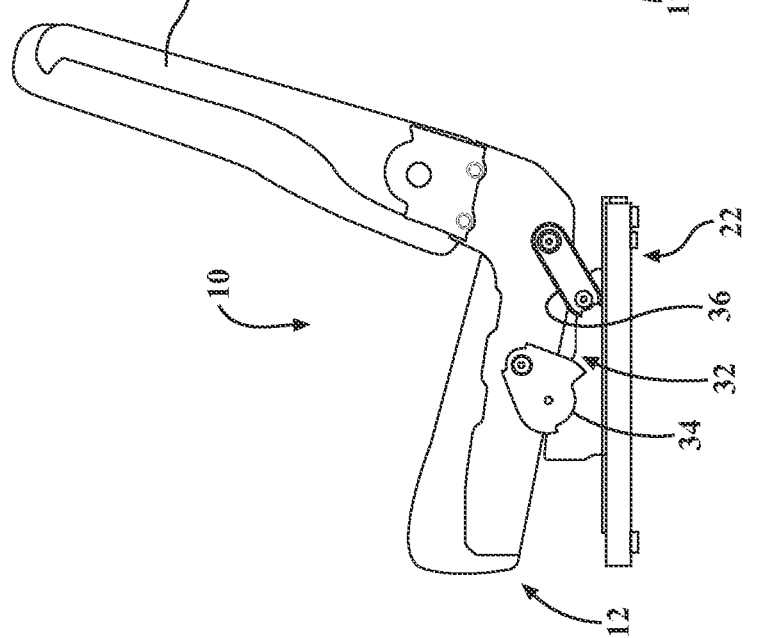
FIG. 3B is a side view of the seat assembly of FIG. 1 showing the seat cushion in the design position.
Figure 3C:
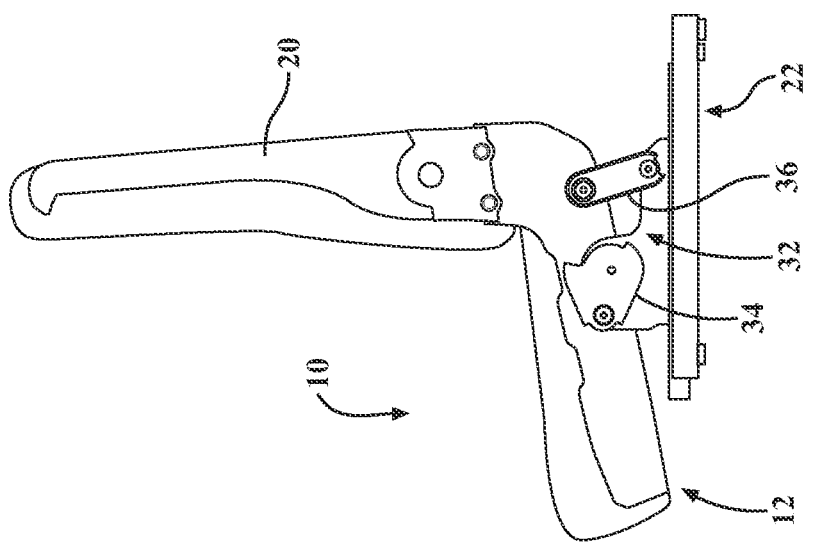
FIG. 3C is a side view of the seat assembly of FIG. 1 showing the seat cushion in a stow position.

The linkage assembly 32 is a four-bar linkage having a pair of laterally spaced apart front links 34 and a pair of laterally spaced apart rear links 36, as shown in FIGS. 1 and 2. However, it is to be appreciated that the linkage assembly 32 may include any suitable number of links or link pairs without varying the scope of the invention. Referring to FIGS. 3A-3C, the linkage assembly 32 is rotatable for moving and tilting the seat cushion 12 relative to the floor of the automotive vehicle between a plurality of positions, including an easy entry position, shown in FIG. 3A, where the seat cushion 12 tilts forwardly and downwardly toward the floor of the automotive vehicle, and a design position, shown in FIG. 3B, where the seat cushion 12 is spaced from the floor of the automotive vehicle to support an occupant. The seat cushion 12 and the seat assembly 10 may also be moved to any number of positions not discussed in detail herein, including a stow position, shown in FIG. 3C, where the seat cushion 12 lowers toward the floor of the automotive vehicle for increased cargo room therein. Further details of the stow position and associated operation of the seat assembly are described in International Patent Publication No. WO/2020/132153, the disclosure of which is hereby incorporated by reference in its entirety.

Figure 4:
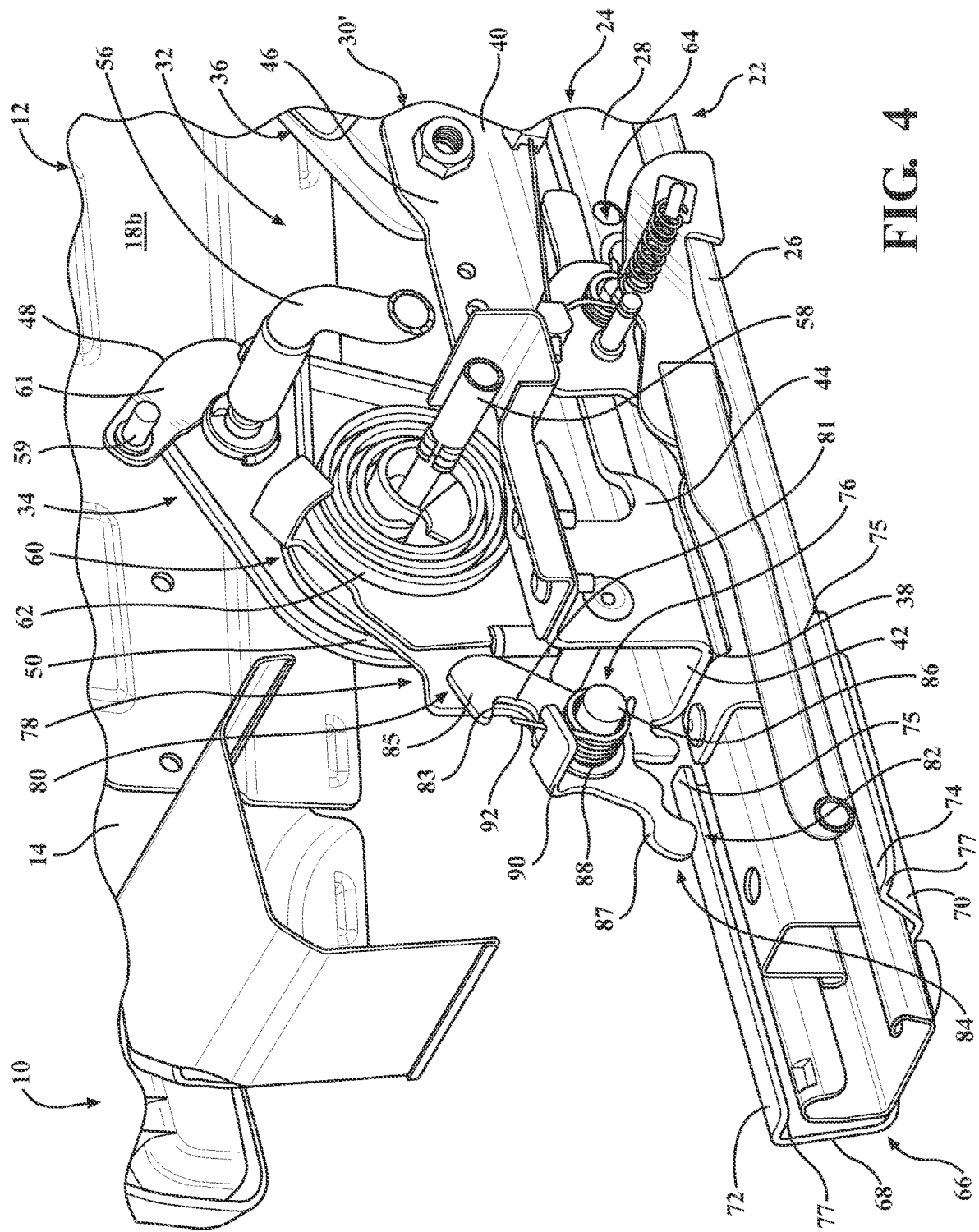
FIG. 4 is a fragmentary perspective view of the seat assembly of FIG. 1 showing the seat cushion in the design position and an interlock element in an unlocked condition.

Referring to FIG. 4, the base member 30 of each sliding track 24 extends between a front portion 38 and a rear portion 40. Each base member 30 has a substantially planar floor 42 fixedly coupled to the sliding member 28 of the respective sliding track 24. A pair of laterally inner and laterally outer side walls 44, 46 extend upwardly from the planar floor 42. The planar floor 42 and the side walls 44, 46 form a generally U-shaped cross-sectional profile at the front portion 38 of the base member 30 and a generally J-shaped cross-sectional profile at the rear portion 40 of the base member 30, wherein the inner side wall 44 is shortened relative to the outer side wall 46. However, it is to be appreciated that the base member 30 may have any shape or structure suitable for use in the seat assembly 10 without varying the scope of the invention.

Figure 5:
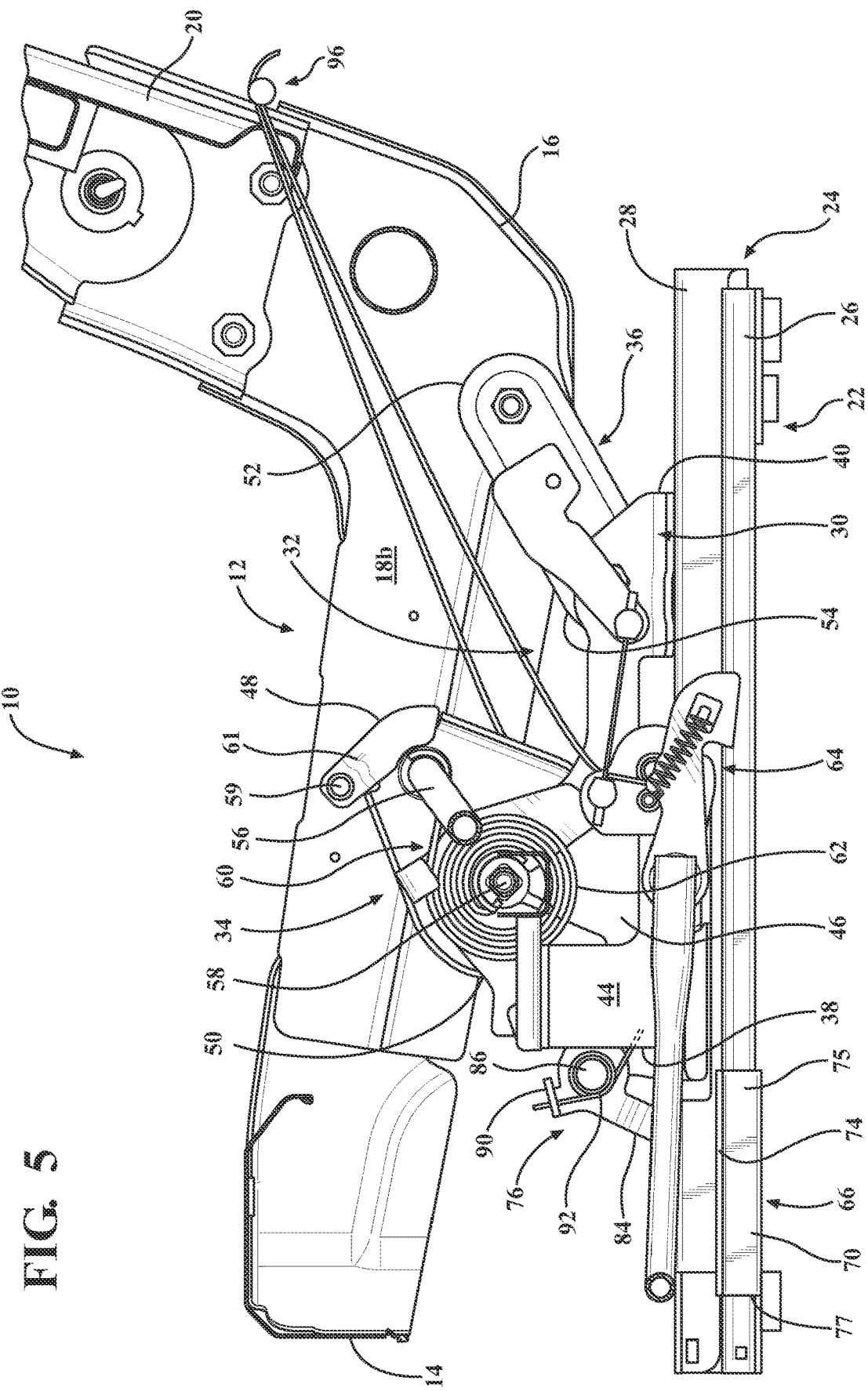
FIG. 5 is a fragmentary cross-sectional side view of the seat assembly of FIG. 1 showing the seat cushion in the design position and the seat assembly within a comfort range at a rearward position within the automotive vehicle.

Referring to FIGS. 1, 2, and 5, the front links 34 are disposed at each lateral side 18a, 18b of the seat cushion 12 adjacent to the front portion 14 thereof, and the rear links 36 are disposed at each lateral side 18a, 18b of the seat cushion 12 adjacent to the rear portion 16 thereof. Each front link 34 extends longitudinally between a first end 48 and an opposite second end 50. The first ends 48 of the front links 34 are rotatably coupled adjacent to the front portion 14 of the seat cushion 12, and the second ends 50 of the front links 34 are rotatably coupled to the outer side wall 46 at the front portion 38 of the base member 30, as shown in FIGS. 4 and 5. Similarly, each rear link 36 extends longitudinally between a first end 52 and an opposite second end 54. The first ends 52 of the rear links 36 are rotatably coupled to the rear portion 16 of the seat cushion 12, and the second ends 54 of the rear links 36 are rotatably coupled to the outer side wall 46 at the rear portion 40 of the base member 30, as shown in FIG. 5. Although only one of each of the front and the rear links 34, 36 is shown in the Figures, it is to be appreciated that each pair of front links 34 and each pair of rear links 36 are substantially the same. Referring to FIGS. 4 and 5, a first support bar 56 extends between the first ends 48 of the front links 34, and a second support bar 58 extends between the second ends 50 of the front links 34, thereby ensuring the front links 34 on each lateral side 18a, 18b of the seat cushion 12 move in tandem. A striker pin 59 extends laterally inward from a bracket 61 coupled the first end 48 of at least one of the front links 34, the bracket 61 positioned distally adjacent to the first support bar 56.

Referring to FIGS. 4 and 5, a linkage locking and release mechanism, shown generally at 60, is operatively coupled between the second end 50 of the front link 34 and the outer side wall 46 at the front portion 38 of the base member 30 for selectively locking and unlocking the front link 34, thereby selectively preventing and allowing rotation of the linkage assembly 32. One potential type of linkage locking and release mechanism 60 is a disc recliner mechanism described in U.S. Pat. No. 8,459,743, the disclosure of which is hereby incorporated by reference in its entirety. However, it is to be appreciated that any suitable linkage locking and release mechanism 60 known in the art could be substituted without varying the scope of the invention. A linkage biasing member 62, such as a torsion spring, is operatively coupled between the second end 50 of the front link 34 and the first support bar 56 to provide a biasing force sufficient to rotatably bias the front link 34, and thus, the linkage assembly 32, to tilt the seat cushion 12 forwardly and downwardly toward the floor of the automotive vehicle to the easy entry position.

Referring to FIGS. 4 and 5, the seat track assembly 22 provides for fore and aft sliding movement of the seat assembly 10 within the automotive vehicle. A track locking and release mechanism, shown generally at 64, is operatively coupled to the seat track assembly 22 for selectively locking and allowing sliding movement of the sliding tracks 24 relative to the fixed tracks 26. The sliding tracks 24 are repositionable along the fixed tracks 26 for moving the seat assembly 10 to any number of locations within a comfort range defined between a rearward position, shown in FIGS. 1 and 5, and an intermediate position, shown in FIG. 6, for achieving desired occupant comfort. The sliding tracks 24 are further repositionable along the fixed tracks 26 for moving the seat assembly 10 within an easy entry range defined between the intermediate position and a forward position, shown in FIGS. 2 and 7, for increased ingress and egress behind the seat assembly 10. One potential type of track locking and release mechanism 64 for use in the seat track assembly 22 is described in U.S. Pat. No. 8,967,719, the disclosure of which is hereby incorporated by reference in its entirety. It should be appreciated, however, that any suitable track locking and release mechanism 64 known in the art could be substituted without varying the scope of the invention. Referring to FIG. 4, a return plate 66 is fixedly coupled to at least one of the fixed tracks 26 for operative engagement with the track locking and release mechanism 64 at the intermediate position to separate the comfort range of the seat assembly 10 from the easy entry range. The return plate 66 extends around the fixed track 26 and includes an outer side wall 68 and an inner side wall 70 flanking the fixed track 26. The outer side wall 68 and the inner side wall 70 terminate at an outer flange 72 and an inner flange 74, respectively, each extending longitudinally between a first end 75 and an opposite second end 77. The outer flange 72 extends inwardly relative to the return plate 66 and is disposed partially over the fixed track 26. Conversely, the inner flange 74 extends outwardly relative to the return plate 66, away from the fixed track 26. The return plate 66 can alternatively take any number of other suitable shapes, including omitting the outer side wall 68 and the outer flange 72 or the inner side wall 70 and the inner flange 74, without varying the scope of the invention.

Figure 8:
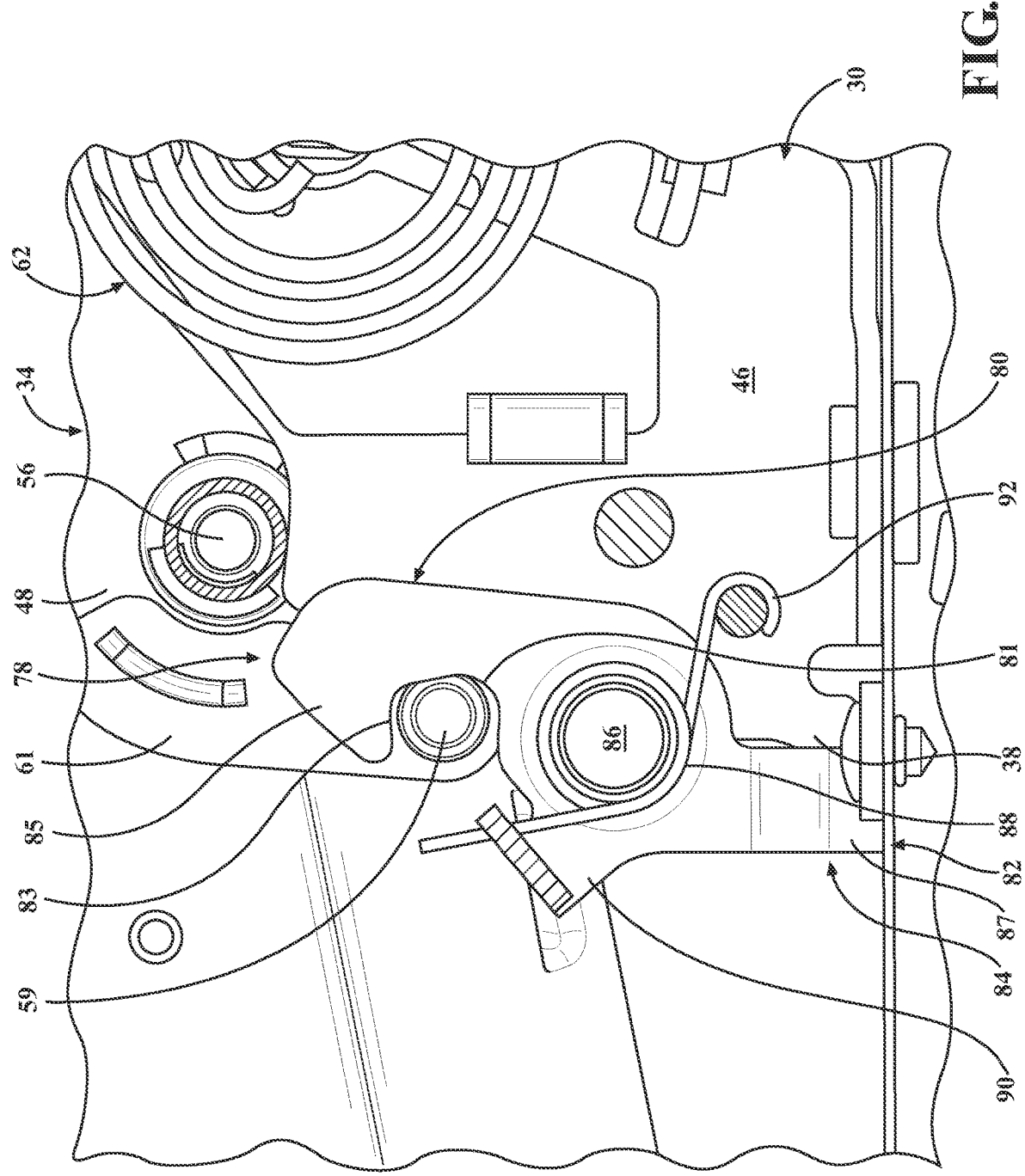
FIG. 8 is an enlarged fragmentary cross-sectional side view of the seat assembly of FIG. 1 showing the interlock element in a locked condition.
Figure 9:
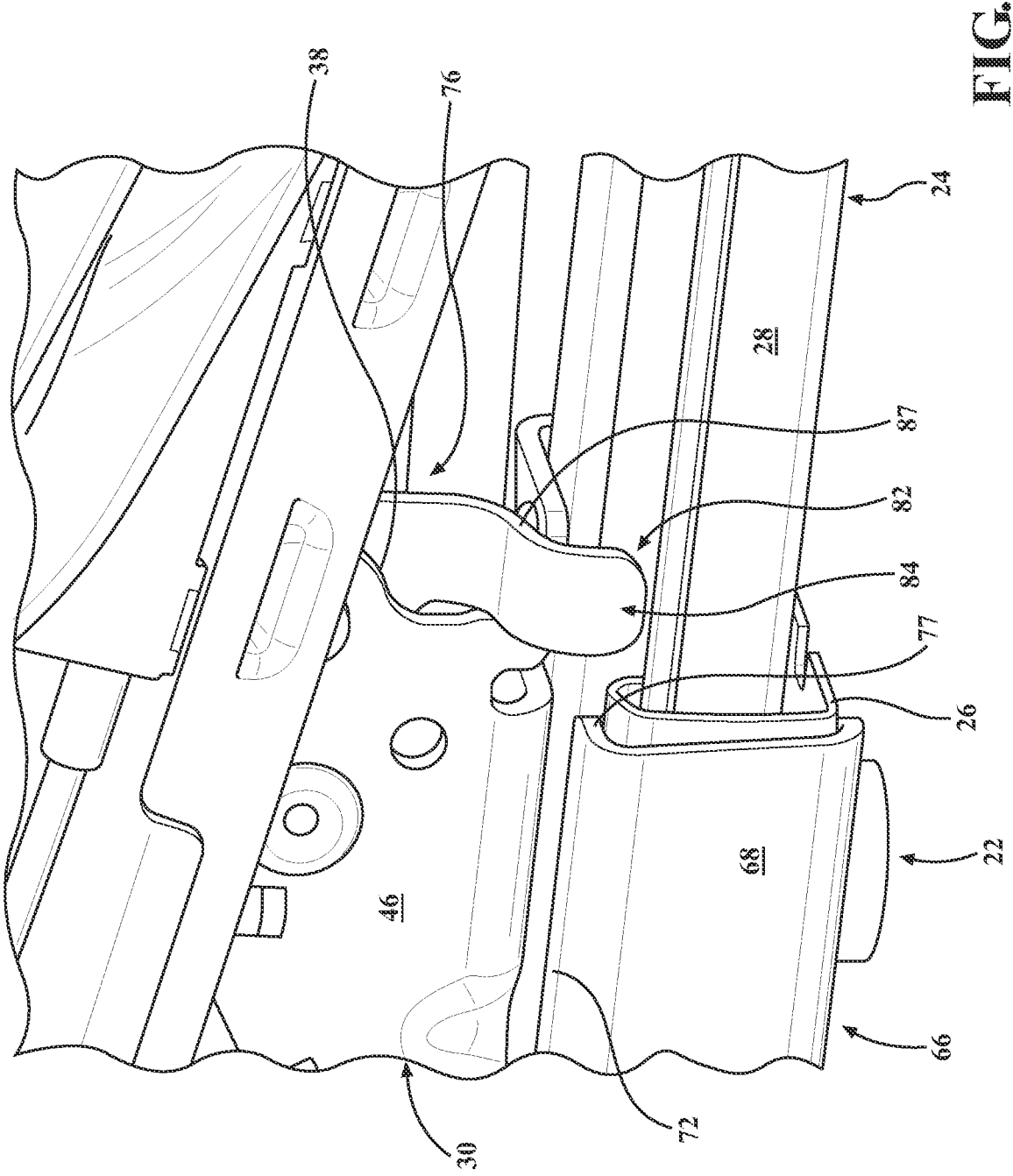
FIG. 9 is an enlarged fragmentary perspective view of the seat assembly of FIG. 1 showing an interlock leg of the interlock element.

Referring to FIGS. 4 and 8, an interlock element 76 is pivotally coupled to the outer side wall 46 at the front portion 38 of at least one of the base members 30 for selectively locking the seat cushion 12 in the easy entry position. The interlock element 76 extends longitudinally between a first end 78 having a forward-facing interlock hook 80 for selectively engaging the striker pin 59 on the front link 34, and a second end 82 having an interlock leg 84 for selectively engaging the return plate 66. The interlock hook 80 includes a recessed portion 81 with a locking surface 83 for accepting and retaining the striker pin 59 and preventing back drive thereof. The interlock hook 80 further includes a cam surface 85 adjacent the locking surface 83 for initial engagement of the striker pin 59 during rotation of the front link 34. The interlock leg 84 includes a laterally offset portion 87 for selectively engaging the outer flange 72 of the return plate 66, as shown in FIGS. 4 and 9. Referring to FIGS. 4 and 8, a pivot pin 86 extends laterally inward from the outer side wall 46 at the front portion 38 of the base member 30, and a hole 88 disposed generally equidistant between the first and second ends 78, 82 of the interlock element 76 receives the pivot pin 86 for pivotally coupling the interlock element 76 to the base member 30. A spring engagement portion 90 extends inwardly from the interlock element 76 substantially equidistant between the first and second ends 78, 82 thereof. An interlock biasing member 92, such as a spring, is operatively coupled between the base member 30 and the spring engagement portion 90 of the interlock element 76 to pivotally bias the interlock element 76 to engage the striker pin 59.

Figure 10A:
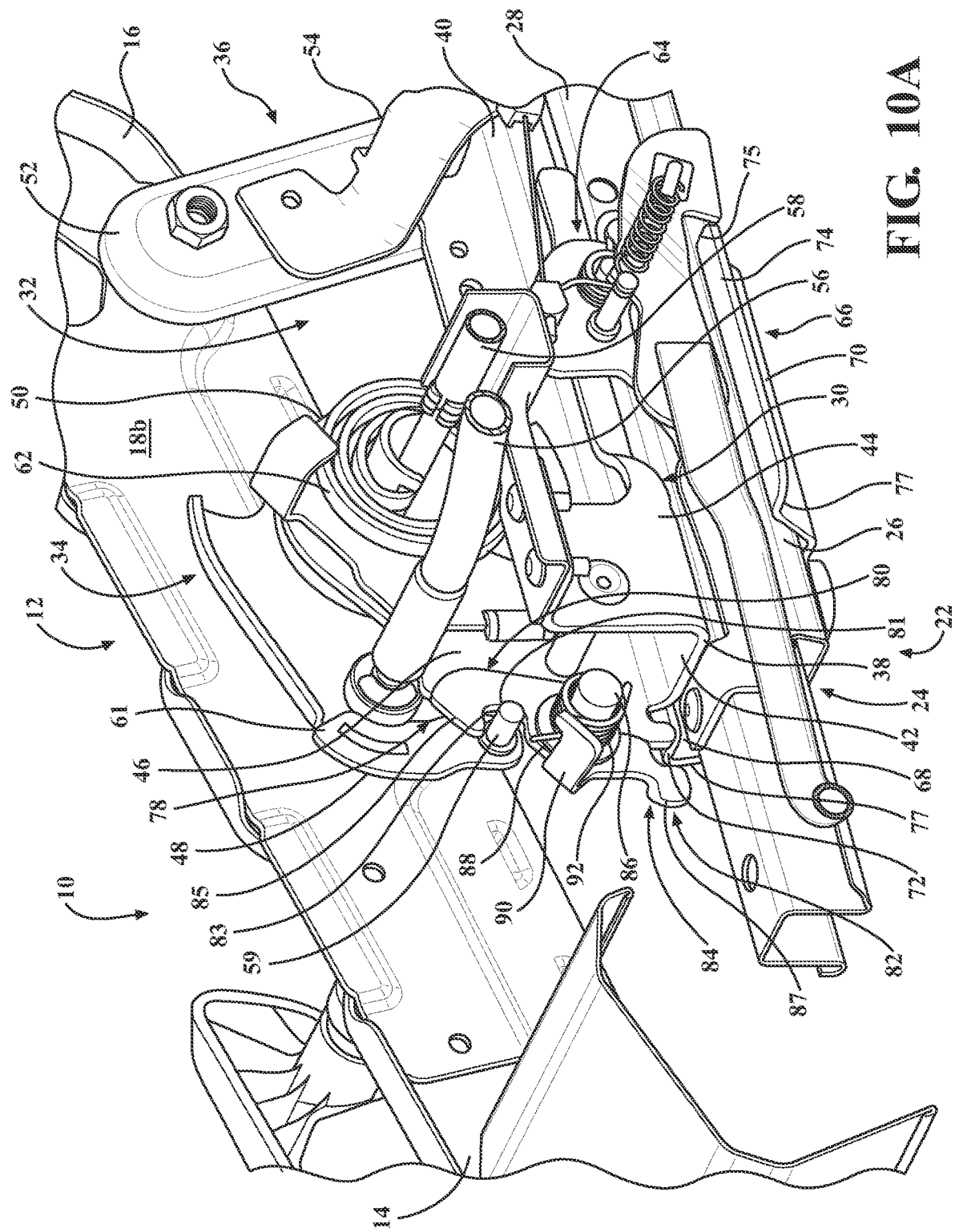
FIG. 10A is a fragmentary perspective view of the seat assembly of FIG. 1 showing the seat cushion in the easy entry position and the interlock element in the locked condition.
Figure 10B:
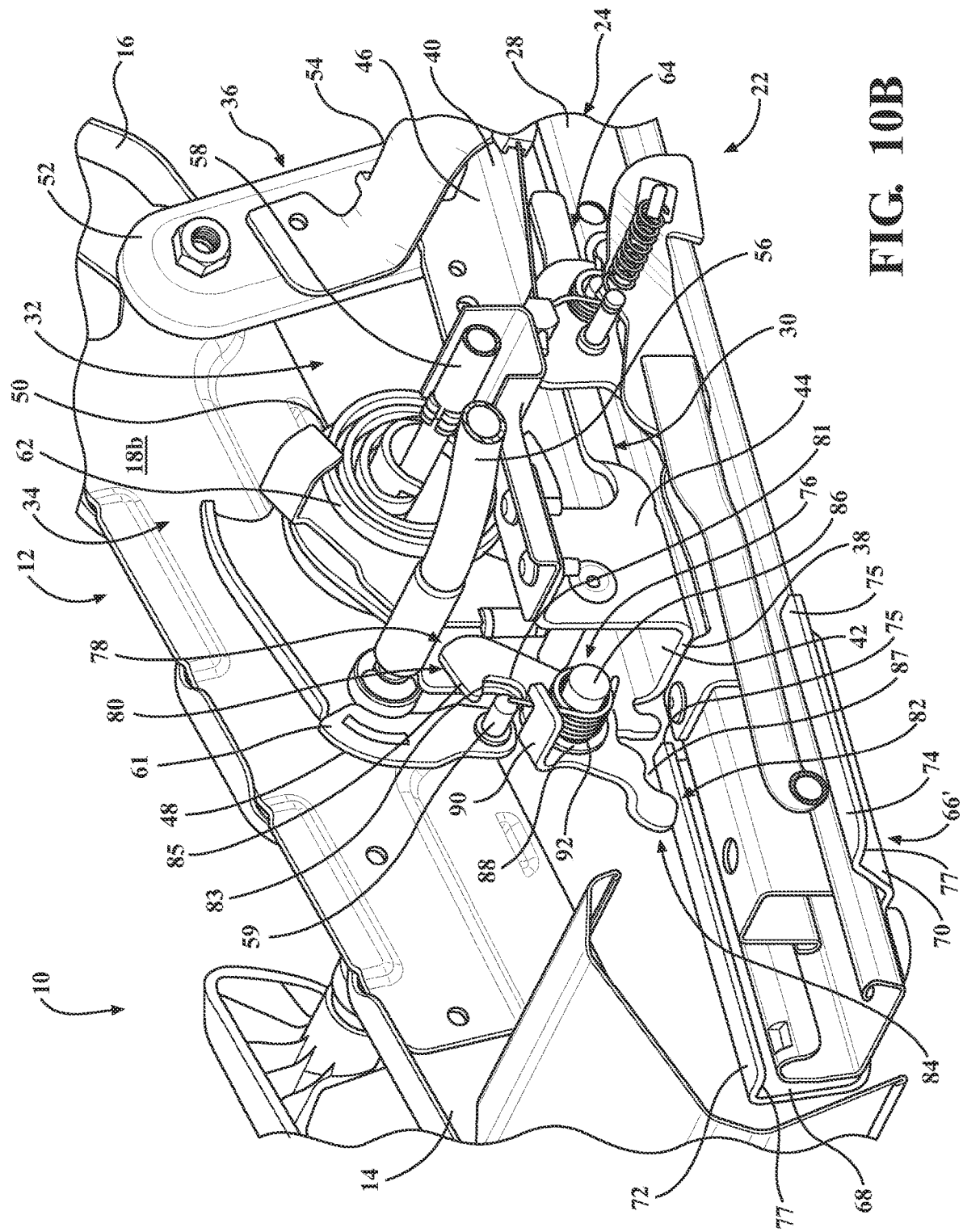
FIG. 10B is a fragmentary perspective view of the seat assembly of FIG. 1 showing the seat cushion in the easy entry position and the interlock element in the unlocked condition.

The interlock element 76 is pivotable between the locked condition, shown in FIGS. 8 and 10A, and an unlocked condition, shown in FIGS. 4 and 10B. In the locked condition, the interlock leg 84 is disengaged from the outer flange 72 of the return plate 66 and the interlock hook 80 is engaged with the striker pin 59 such that the striker pin 59 is disposed within the recessed portion 81 of the interlock hook 80 and secured by the locking surface 83 to retain the seat cushion 12 in the easy entry position. Conversely, in the unlocked condition, the interlock leg 84 is engaged with the outer flange 72 of the return plate 66 between the first and second ends 75, 77 thereof, and the interlock hook 80 is disengaged with the striker pin 59 such that the striker pin 59 is spaced from the recessed portion 81 of the interlock hook 80 for allowing movement of the seat cushion 12 to and from the design position.

Figure 11:
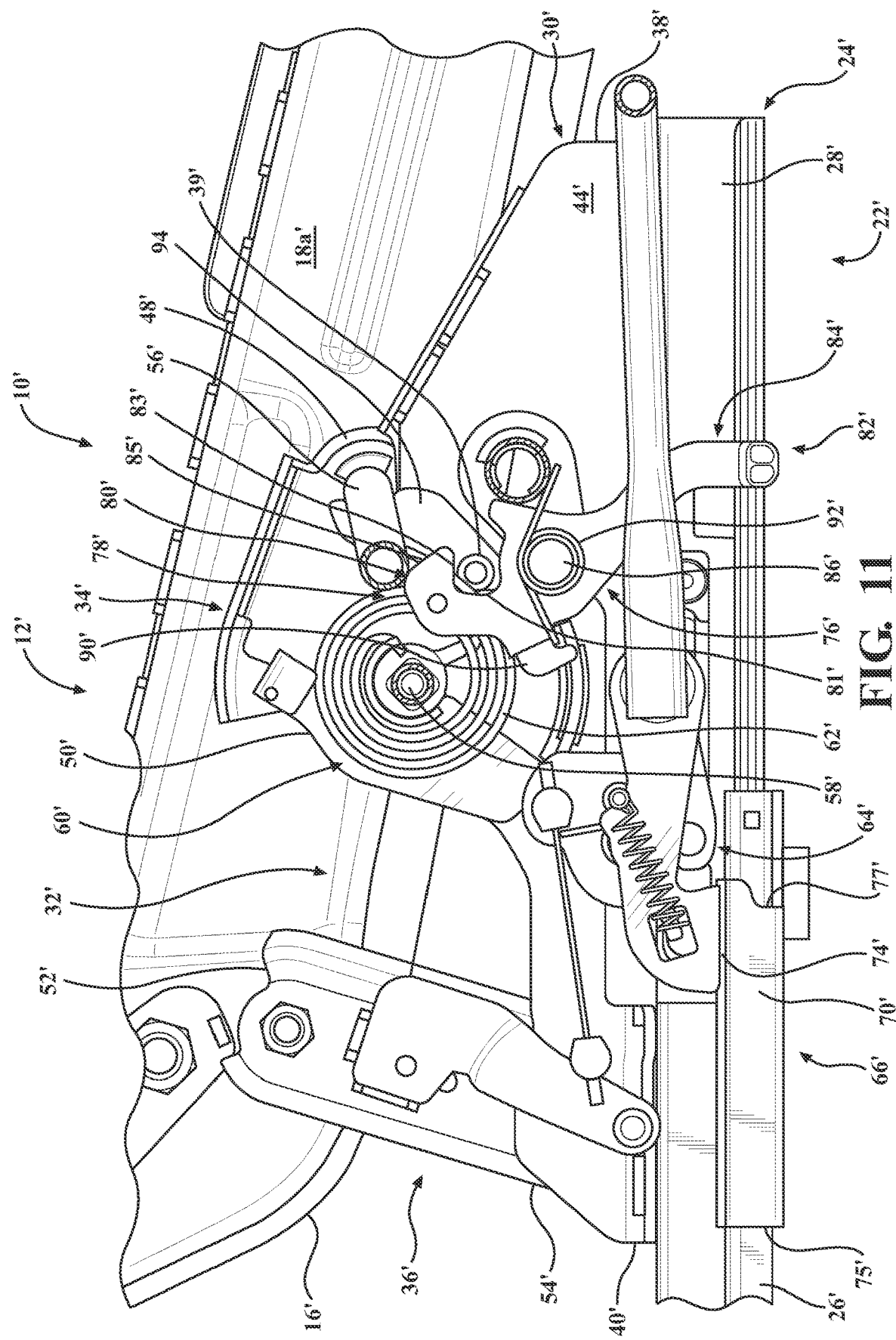
FIG. 11 is a fragmentary cross-sectional side view a seat assembly for use in an automotive vehicle according to an alternative embodiment of the present invention showing an alternative interlock element in a locked condition.
Figure 12:
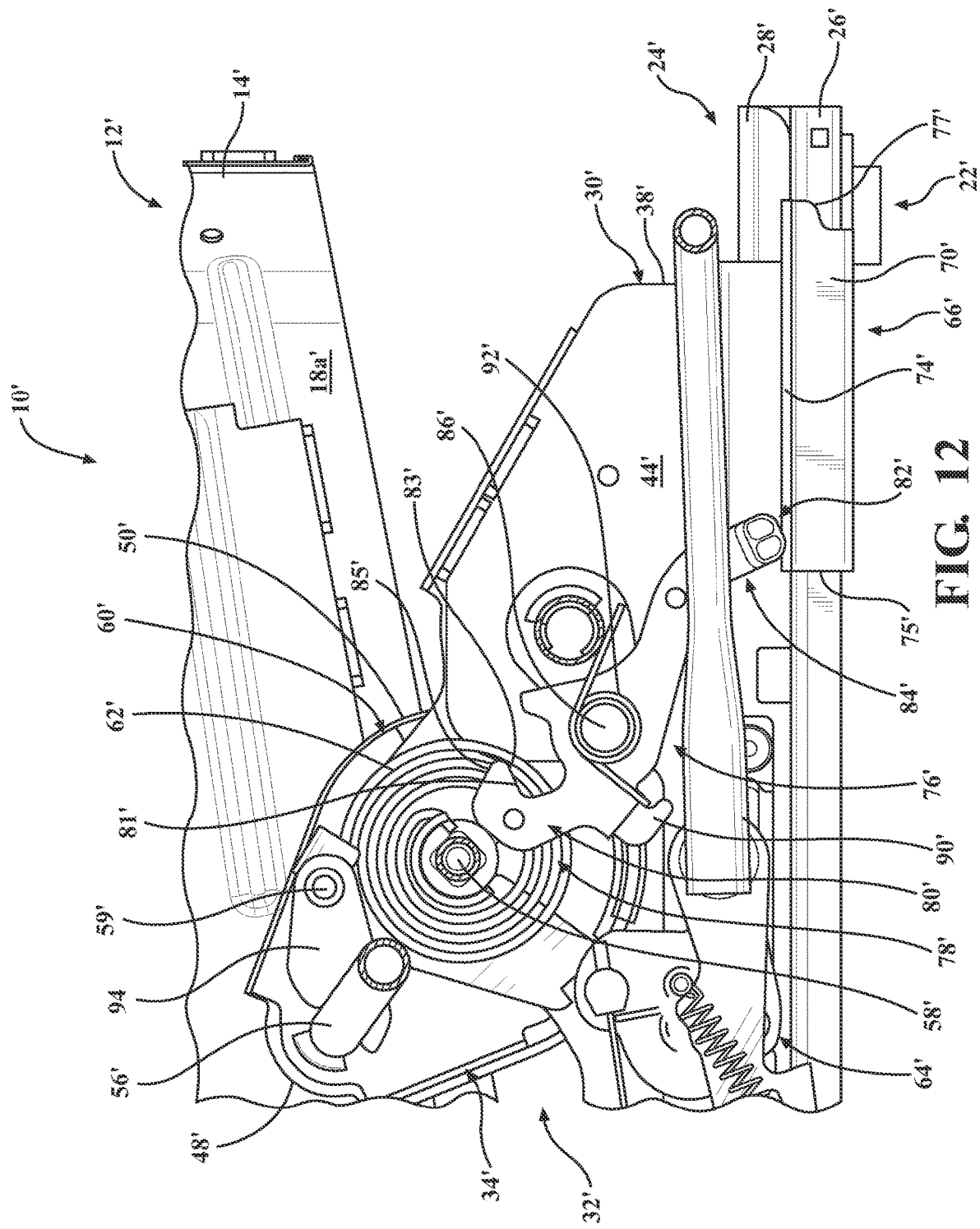
FIG. 12 is a fragmentary cross-sectional side view of the seat assembly of FIG. 11 showing the alternative interlock element in an unlocked condition.
Figure 13:
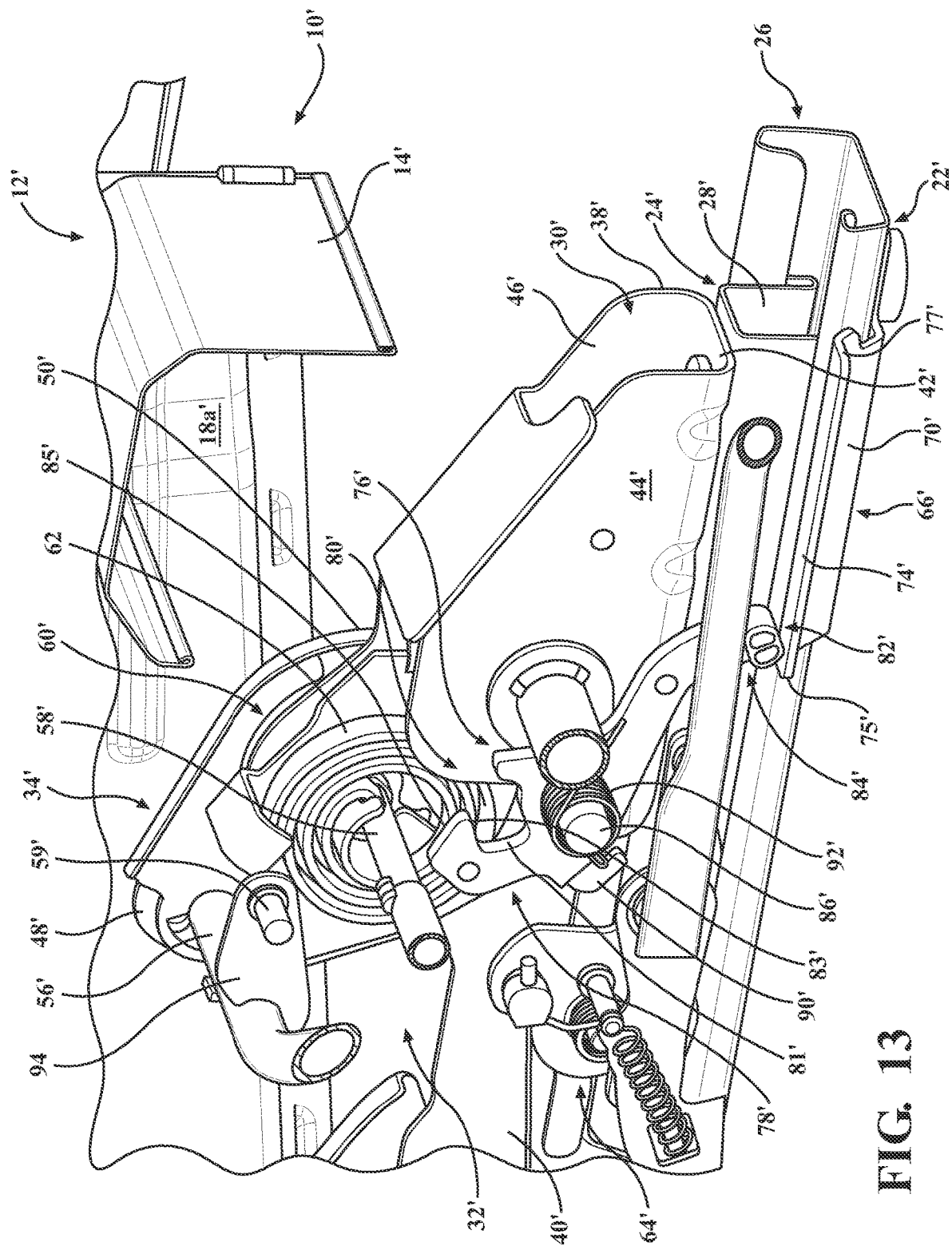
FIG. 13 is a fragmentary perspective view of the seat assembly of FIG. 8 further showing the alternative interlock element in the unlocked condition.

An alternative embodiment of the seat assembly 10 is shown in FIGS. 11-13, wherein like elements of the alternative embodiment include primed like element numbers and, as the elements are substantially similar, will not be further explained herein. Rather than pivotally coupling to the outer side wall 46' of the base member 30', the alternative interlock element 76' is pivotally coupled to the inner side wall 44' at the front portion 38' the base member 30' for selectively locking the seat cushion 12' in the easy entry position. The interlock leg 84' of the alternative interlock element 76' instead engages the inner flange 74' of the return plate 66' when the alternative interlock element 76' is in the unlocked condition, as shown in FIGS. 12 and 13. Additionally, the spring engagement portion 90' of the interlock element 76' extends away from the first end 78' of the alternative interlock element 76' opposite to the interlock hook 80' for coupling with the interlock biasing member 92'. To account for the alternative placement of the interlock element 76', the striker pin 59' instead extends inwardly from a bracket 94 coupled to and extending perpendicularly from the first support bar 56', wherein the bracket 94 is laterally spaced from the front link 34'.

Conventional means of actuation known in the art, such as a cable-type actuation assembly 96, shown in FIGS. 1, 2, and 5-7, are used to selectively actuate the linkage locking and release mechanism 60 and the track locking and release mechanism 64. However, it should be appreciated that any number of alternative actuation assemblies 96 known in the art may be used without varying the scope of the invention.

Figure 6:
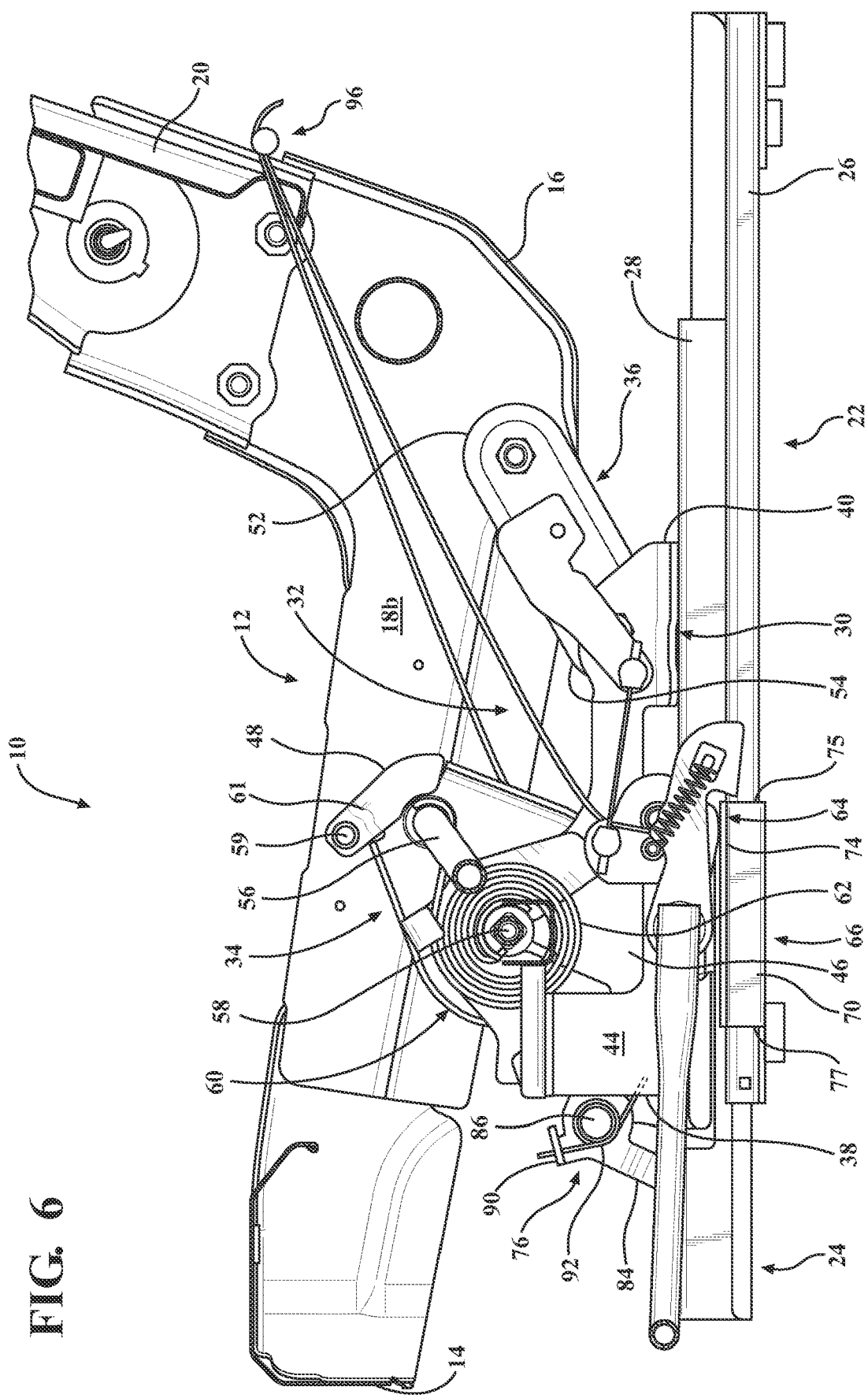
FIG. 6 is a fragmentary cross-sectional side view of the seat assembly of FIG. 1 showing the seat cushion in the design position and the seat assembly within the comfort range at an intermediate position within the automotive vehicle.

Referring to FIGS. 5 and 6, the seat cushion 12 is situated in the design position spaced from the floor of the automotive vehicle for supporting an occupant, and the seat assembly 10 is disposed on the fixed tracks 26 within the comfort range in any one of a number of locations between the rearward and intermediate positions for occupant comfort. When the seat assembly 12 is disposed in the comfort range, the interlock leg 84 is engaged with the outer flange 72 of the return plate 66 between the first and second ends 75, 77 thereof, as shown in FIG. 4. The interlock element 76 is therefore held in the unlocked condition and the interlock hook 80 is prevented from engaging the striker pin 59. The striker pin 59 is spaced apart from the recessed portion 81 of the interlock hook 80 for allowing movement of the seat cushion 12 from the design position to the easy entry position upon actuation and unlocking of the linkage locking and release mechanism 60.

Figure 7:
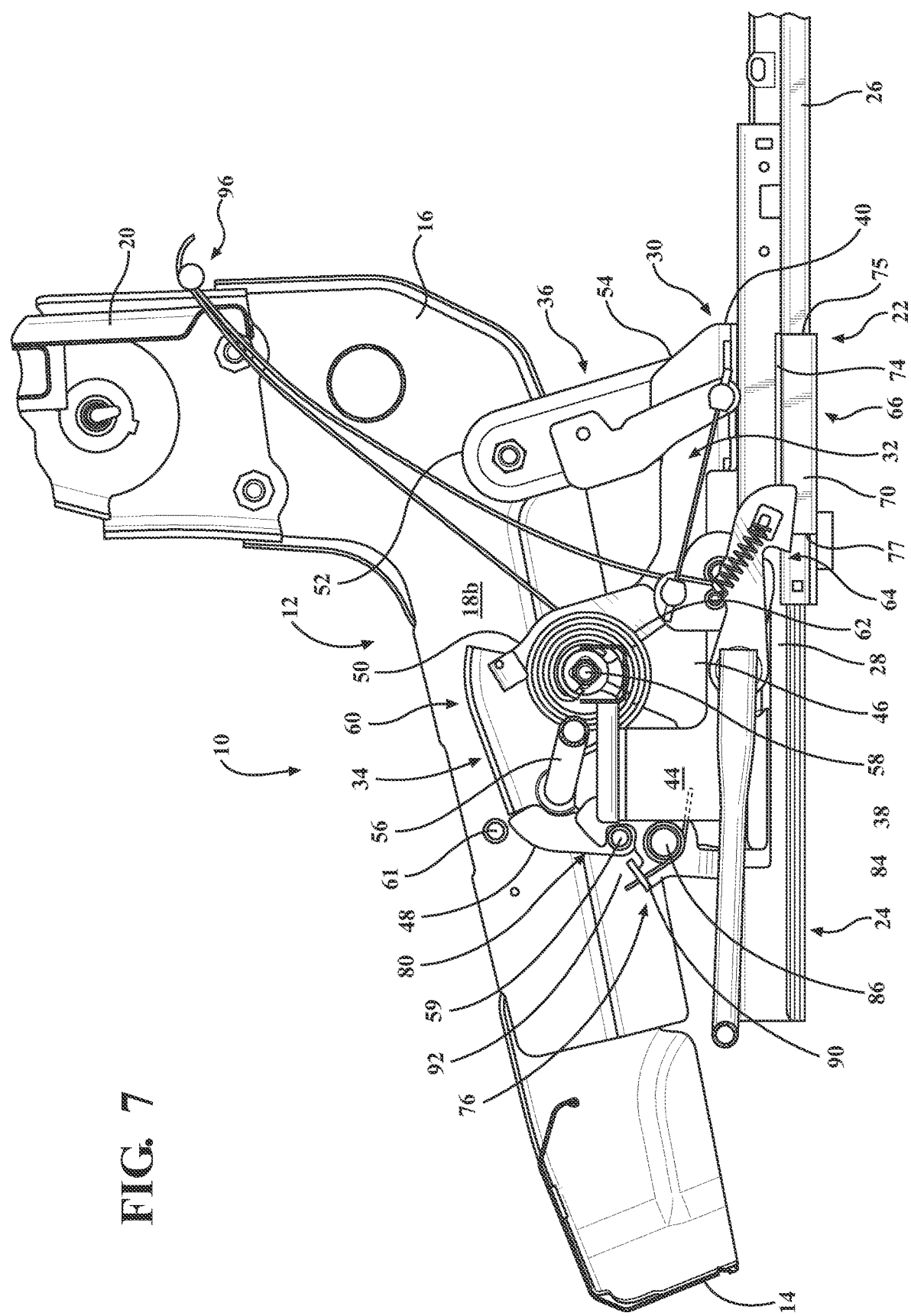
FIG. 7 is a fragmentary cross-sectional side view of the seat assembly of FIG. 1 showing the seat cushion in the easy entry position and the seat assembly within an easy entry range at a forward position within the automotive vehicle.

Referring to operation of the seat assembly 10, a user actuates the cable-type actuation assembly 96 to move the seat cushion 12 from the design position to the easy entry position and to reposition the seat assembly 10 from the comfort range to the easy entry range. Actuation of the linkage locking and release mechanism 60 via the cable-type actuation assembly 96 correspondingly unlocks the linkage assembly 32. With the linkage assembly 32 unlocked, the front and rear links 34, 36 rotate in a first direction (counterclockwise when viewed from FIGS. 1 and 2) due to the biasing force of the linkage biasing member 62. The seat cushion 12 therefore tilts forwardly and downwardly toward the floor of the automotive vehicle, and the striker pin 59 extending from the front link 34 correspondingly rotates in the first direction toward the interlock hook 80 of the interlock element 76, as shown in FIG. 10B. Actuation of the track locking and release mechanism 64 via the cable-type actuation assembly 96 (either simultaneously or sequentially with the linkage locking and release mechanism 60) unlocks the seat track assembly 22, causing the sliding tracks 24, and therefore, the seat assembly 10, to slide forward along the fixed tracks 26 away from the comfort range. As the seat assembly 10 moves from the comfort range toward the easy entry range, the interlock leg 84 correspondingly slides along the outer flange 72 of the return plate 66 toward the second end 77 thereof. As the seat assembly 10 passes the intermediate position, the interlock leg 84 slides past and disengages the second end 77 of the outer flange 72. With the interlock leg 84 disengaged from the outer flange 72, the interlock element 76 is no longer held in the unlocked condition by the return plate 66, as shown in FIG. 10A. The interlock element 76 pivots in the first direction (counter-clockwise when viewed from FIGS. 10A and 10B) to the locked condition due to the biasing force of the interlock biasing member 92. The recessed portion 81 of the interlock hook 80 receives the striker pin 59, and the seat cushion 12 is held in the easy entry position while the seat assembly is disposed within the easy entry range, as shown in FIGS. 2 and 7, for increased ingress and egress behind the seat assembly 10.

Similarly, the user actuates the cable-type actuation assembly 96 to move the seat cushion 12 from the easy entry position to the design position and to reposition the seat assembly 10 from the easy entry range to the comfort range. Actuation of the linkage locking and release mechanism 60 via the cable-type actuation assembly 96 correspondingly unlocks the linkage assembly 32. However, as shown in FIG. 10A, the linkage assembly 32 is initially prevented from rotating in a second direction (clockwise when viewed from FIG. 2) toward the design position due to the locked condition of the interlock element 76, which is engaged with the striker pin 59 extending from the front link 34. Actuation of the track locking and release mechanism 64 (either simultaneously or sequentially with the linkage locking and release mechanism 60) unlocks the seat track assembly 22, and the user is able to slide the seat assembly 10 rearwardly along the fixed tracks 26 from the easy entry range to the comfort range. Alternatively, the linkage locking and release mechanism 60 and the track locking and release mechanism 64 may be retained an unlocked condition when the seat cushion 12 is in the easy entry position and the seat assembly 10 is in the easy entry range, thus negating the need to actuate the cable-type actuation assembly 96.

As the user moves the seat assembly 10 from the easy entry range toward the comfort range, the interlock leg 84 correspondingly slides toward the second end 77 of the outer flange 72 of the return plate 66. As the seat assembly 10 passes the intermediate position, the interlock leg 84 again engages the second end 77 of the outer flange 72 of the return plate 66, causing the interlock element 76 to pivot in the second direction (clockwise when viewed from FIG. 10B) and release the striker pin 59 from the recessed portion 81 of the interlock hook 80, as shown in FIG. 10B. As the seat assembly 10 continues to travel within the comfort range, the interlock leg 84 continues to engage the outer flange 72 of the return plate 66, therefore holding the interlock element 76 in the unlocked condition, as shown in FIG. 4. The user is then able to push rearwardly on the seat cushion 12 to overcome the biasing force of the linkage biasing member 62 and simultaneously rotate the front and rear links 34, 36 in the second direction (clockwise when viewed from FIG. 4) to return the seat cushion 12 to the design position, shown in FIGS. 1 and 5.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A seat assembly adapted to be mounted to a floor of an automotive vehicle for movement between a plurality of positions, the seat assembly comprising:
   a seat cushion for supporting an occupant in the automotive vehicle;
   a seat back pivotally coupled to the seat cushion;
   a seat track assembly for sliding movement of the seat assembly between a forward position and a rearward position along the floor of the automotive vehicle, the seat track assembly including a sliding track repositionable along a fixed track;
   at least one link extending longitudinally between the seat cushion and the sliding track, the at least one link rotatable for moving the seat cushion between an easy entry position in which the seat cushion tilts forwardly and downwardly toward the floor of the automotive vehicle and a design position in which the seat cushion is spaced from the floor of the automotive vehicle to support an occupant;
   an interlock element pivotally coupled to the sliding track, the interlock element extending longitudinally between a first end having an interlock hook and a second end having an interlock leg,
   wherein movement of the seat assembly from the forward position to the rearward position pivots the interlock element from a locked condition in which the interlock hook is engaged with one of the seat cushion or the at least one link for holding the seat cushion in the easy entry position to an unlocked condition in which the interlock hook is disengaged from the one of the seat cushion or the at least one link for allowing movement of the seat cushion to the design position; and
   a return plate fixedly coupled to the fixed track,
   wherein the return plate is arranged on the fixed track such that the interlock leg of the interlock element rests on the return plate when the seat cushion is in the design position, thereby retaining the interlock element in the unlocked condition for allowing movement of the seat cushion.

2. The seat assembly of claim 1 wherein movement of the seat assembly from the forward position to the rearward position causes the interlock leg to engage the return plate to pivot the interlock element from the locked condition to the unlocked condition, preferably further defining an intermediate position of the seat assembly along the floor of the automotive vehicle disposed between the forward position and the rearward position.

3. The seat assembly of claim 2 further defining an intermediate position of the seat assembly along the floor of the automotive vehicle disposed between the forward position and the rearward position.

4. The seat assembly of claim 3 wherein movement of the seat assembly from the forward position to the rearward position causes the interlock leg to engage the return plate when the seat track assembly reaches the intermediate position, thereby unlocking the interlock element and allowing movement of the seat cushion from the easy entry to the design position.

5. The seat assembly of claim 1 wherein the interlock hook engages the seat cushion in the locked condition and disengages the seat cushion in the unlocked condition.

6. The seat assembly of claim 1 wherein the interlock hook engages the at least one link in the locked condition and disengages the at least one link in the unlocked condition.

7. The seat assembly of claim 6 wherein the interlock element is pivotally biased to the locked condition for automatic engagement with the at least one link when the interlock leg is disengaged from the return plate and the at least one link is rotated to move the seat cushion from the design position to the easy entry position.

8. The seat assembly of claim 7 further comprising a striker pin extending from the at least one link for engagement with the interlock hook when the interlock element is in the locked condition.

9. The seat assembly of claim 7 further comprising a bracket fixedly coupled to the at least one link and a striker pin extending from the bracket for engagement with the interlock hook when the interlock element is in the locked condition.

10. The seat assembly of claim 9 further comprising a pivot pin extending laterally from the sliding track.

11. The seat assembly of claim 10 wherein the interlock element includes hole disposed between the first and second ends thereof for receiving the pivot pin to pivotally couple the interlock element to the sliding track.

12. The seat assembly of claim 11 wherein the interlock element is pivotally biased to the locked condition by a spring.

13. The seat assembly of claim 12 wherein the interlock element includes a spring engagement portion extending therefrom substantially equidistant between the first and second ends thereof.

14. The seat assembly of claim 13 wherein the spring is operatively coupled between the spring engagement portion of the interlock element and the sliding track to bias the interlock element to the locked condition.

15. The seat assembly of claim 14 wherein the at least one link is further rotatable to move the seat cushion to a stow position in which the seat cushion lowers toward the floor of the automotive vehicle for increased cargo room therein.

16. The seat assembly of claim 15 wherein the at least one link includes a front link and a rear link extending longitudinally between the seat cushion and the sliding track for movement of the seat cushion between a plurality of positions within the automotive vehicle.

17. The seat assembly of claim 16 wherein the bracket with the striker pin is fixedly coupled to the front link.

18. The seat assembly of claim 17 wherein the sliding track includes a base member fixedly coupled to a sliding member, wherein the sliding member engages the fixed track and the interlock element is pivotally coupled to the base member.

19. The seat assembly of claim 18 wherein the return plate extends around the fixed track and has an outer side wall and an inner side wall, each outer and inner side wall including a laterally-extending flange.

20. The seat assembly of claim 19 wherein the laterally-extending flange at the outer side wall of the return plate extends above and at least partially over the fixed track.

21. The seat assembly of claim 20 wherein the base member has a floor fixedly coupled to the sliding member and pair of laterally inner and laterally outer side walls extending upwardly therefrom.

22. The seat assembly of claim 21 wherein the interlock element is pivotally coupled to the laterally outer side wall of the base member.

23. The seat assembly of claim 21 wherein the interlock element is pivotally coupled to the laterally inner side wall of the base member.

24. The seat assembly of claim 22 wherein the interlock leg selectively engages the laterally-extending flange at the outer side wall of the return plate.

25. The seat assembly of claim 23 wherein the interlock leg selectively engages the laterally-extending flange at the inner side wall of the return plate.

26. A seat assembly adapted to be mounted to a floor of an automotive vehicle for movement between a plurality of positions, the seat assembly comprising:
   a seat cushion for supporting an occupant in the automotive vehicle;
   a seat back pivotally coupled to the seat cushion;
   a seat track assembly for sliding movement of the seat assembly between a forward position and a rearward position along the floor of the automotive vehicle, the seat track assembly including a sliding track repositionable along a fixed track;
   at least one link extending longitudinally between the seat cushion and the sliding track, the at least one link rotatable for moving the seat cushion between an easy entry position in which the seat cushion tilts forwardly and downwardly toward the floor of the automotive vehicle and a design position in which the seat cushion is spaced from the floor of the automotive vehicle to support an occupant;
   an interlock element pivotally coupled to the sliding track, the interlock element extending longitudinally between a first end having an interlock hook and a second end having an interlock leg,
   wherein movement of the seat assembly from the forward position to the rearward position pivots the interlock element from a locked condition in which the interlock hook is engaged with one of the seat cushion or the at least one link for holding the seat cushion in the easy entry position to an unlocked condition in which the interlock hook is disengaged from the one of the seat cushion or the at least one link for allowing movement of the seat cushion to the design position;
   a return plate fixedly coupled to the fixed track; and
   a bracket fixedly coupled to the at least one link and a striker pin extending from the bracket and the at least one link for engagement with the interlock hook when the interlock element is in the locked condition.

* * * * *